(12) United States Patent
Siegel

(10) Patent No.: US 7,762,776 B2
(45) Date of Patent: Jul. 27, 2010

(54) VORTEX SHEDDING CYCLICAL PROPELLER

(75) Inventor: Stefan Günther Siegel, Pueblo, CO (US)

(73) Assignee: Siegel Aerodynamics, Inc., Pueblo, CO (US)

( * ) Notice: Subject to any disclaimer, the term of this patent is extended or adjusted under 35 U.S.C. 154(b) by 521 days.

(21) Appl. No.: 11/375,817

(22) Filed: Mar. 14, 2006

(65) Prior Publication Data

US 2007/0215747 A1    Sep. 20, 2007

(51) Int. Cl.
    *B63H 1/08*    (2006.01)
(52) U.S. Cl. .............................. 416/111; 244/20; 440/93
(58) Field of Classification Search .................. 244/9, 244/10, 204.1, 20; 416/111, 98, 110; 415/914; 440/93
    See application file for complete search history.

(56) References Cited

U.S. PATENT DOCUMENTS

| | | | | |
|---|---|---|---|---|
| 1,835,018 | A | * | 12/1931 | Darrieus ..................... 415/224 |
| 3,258,074 | A | * | 6/1966 | Blickle et al. ................ 416/108 |
| 3,326,296 | A | * | 6/1967 | Hill et al. ..................... 416/92 |
| 3,639,077 | A | | 2/1972 | Slates |
| 3,716,014 | A | * | 2/1973 | Laucks et al. ................. 440/93 |
| 3,902,072 | A | * | 8/1975 | Quinn ........................... 290/44 |
| 3,995,972 | A | * | 12/1976 | Nassar ......................... 416/68 |
| 4,024,409 | A | * | 5/1977 | Payne .......................... 290/55 |
| 4,048,947 | A | | 9/1977 | Sicard |
| 4,137,005 | A | | 1/1979 | Comstock |
| 4,180,367 | A | | 12/1979 | Drees |
| 4,210,299 | A | * | 7/1980 | Chabonat ..................... 244/20 |
| 4,221,538 | A | | 9/1980 | Wells |
| 4,247,253 | A | | 1/1981 | Seki et al. |
| 4,264,279 | A | | 4/1981 | Dereng |
| 4,285,636 | A | | 8/1981 | Kato et al. |
| 4,313,711 | A | | 2/1982 | Lee |

(Continued)

FOREIGN PATENT DOCUMENTS

WO    WO 00/40859    7/2000

OTHER PUBLICATIONS

Biwas, Sumitabh et al., "A New Analytical Model for the Aerodynamic Performance Analysis of Vertical Axis Wind Turbines" *Wind Engineering*, vol. 19, No. 2 (1995) p. 107-119.

(Continued)

*Primary Examiner*—Michael R Mansen
*Assistant Examiner*—Brian M O'Hara
(74) *Attorney, Agent, or Firm*—David T. Millers

(57) ABSTRACT

A propeller having one or more blades eccentrically mounted to a shaft dynamically changes the blade pitch to produce free vortices in a fluid. For extracting energy from a moving fluid, the fluid flow acting on the blades rotates the propeller, while the pitch changes create a fluid flow pattern known as a von Karman vortex street. The resulting time averaged flow field distant from the propeller is a wake flow, and the energy of the fluid flow can be efficiently converted to rotation of a shaft driven device. For propulsion, applied shaft rotation and the dynamic pitch change in a fluid together create a flow pattern that is the inverse of the von Karman vortex street. For either energy extraction or propulsion, the propeller is particularly suited for low flow speeds, where the effects of low Reynolds number induced flow separation on blades may make other propellers inefficient.

12 Claims, 4 Drawing Sheets

U.S. PATENT DOCUMENTS

| | | | |
|---|---|---|---|
| 4,329,116 A | | 5/1982 | Ljungstrom |
| 4,340,821 A | | 7/1982 | Slonim |
| 4,347,036 A | * | 8/1982 | Arnold ............................ 416/1 |
| 4,368,392 A | | 1/1983 | Drees |
| 4,380,417 A | * | 4/1983 | Fork ............................ 416/108 |
| 4,415,312 A | | 11/1983 | Brenneman |
| 4,422,825 A | | 12/1983 | Boswell |
| 4,430,044 A | | 2/1984 | Liljegre |
| 4,443,708 A | | 4/1984 | Lapeyre |
| 4,449,053 A | | 5/1984 | Kutcher |
| 4,464,578 A | | 8/1984 | Masubuchi |
| 4,527,950 A | | 7/1985 | Biscomb |
| 4,533,292 A | | 8/1985 | Sugihara |
| 4,555,218 A | | 11/1985 | Jonsson et al. |
| 4,566,854 A | | 1/1986 | Slezak |
| 4,608,497 A | | 8/1986 | Boyce |
| 4,622,471 A | | 11/1986 | Schroeder |
| 4,630,440 A | | 12/1986 | Meyerand |
| 4,656,959 A | | 4/1987 | Moisdon |
| 4,672,222 A | | 6/1987 | Ames |
| 4,719,158 A | | 1/1988 | Salomon |
| 4,732,350 A | | 3/1988 | Lamont |
| 4,752,258 A | * | 6/1988 | Hochleitner et al. ........... 440/93 |
| 4,808,074 A | | 2/1989 | South |
| 4,832,569 A | | 5/1989 | Samuelsen et al. |
| 4,914,915 A | | 4/1990 | Linderfelt |
| 4,931,662 A | | 6/1990 | Burton |
| 5,054,999 A | | 10/1991 | Jonsson |
| 5,136,173 A | | 8/1992 | Rynne |
| 5,256,034 A | * | 10/1993 | Sultzbaugh ................... 416/91 |
| 5,265,827 A | * | 11/1993 | Gerhardt ....................... 244/20 |
| 5,269,647 A | | 12/1993 | Moser |
| 5,311,064 A | | 5/1994 | Kumbatovic |
| 5,391,926 A | | 2/1995 | Staley et al. |
| 5,462,406 A | * | 10/1995 | Ridgewell et al. ............ 416/111 |
| 5,499,904 A | | 3/1996 | Wallace |
| 5,577,882 A | | 11/1996 | Istorik et al. |
| 5,588,798 A | | 12/1996 | Fork |
| 5,642,984 A | | 7/1997 | Gorlov |
| 5,703,474 A | | 12/1997 | Smalser |
| 5,708,305 A | | 1/1998 | Wolfe |
| 5,789,826 A | | 8/1998 | Kumbatovic |
| 5,808,368 A | | 9/1998 | Brown |
| 5,929,531 A | | 7/1999 | Lagno |
| 5,993,157 A | * | 11/1999 | Perfahl ........................ 416/111 |
| 6,023,105 A | | 2/2000 | Youssef |
| 6,036,443 A | | 3/2000 | Gorlov |
| 6,109,875 A | * | 8/2000 | Gross .......................... 416/111 |
| 6,191,496 B1 | | 2/2001 | Elder |
| 6,231,004 B1 | * | 5/2001 | Peebles ........................ 244/10 |
| 6,244,919 B1 | * | 6/2001 | Valentini ...................... 440/93 |
| 6,293,835 B2 | | 9/2001 | Gorlov |
| 6,360,534 B1 | | 3/2002 | Denniss |
| 6,388,342 B1 | | 5/2002 | Vetterick, Sr. et al. |
| 6,394,745 B1 | * | 5/2002 | Quraeshi ..................... 415/4.1 |
| 6,417,578 B1 | | 7/2002 | Chapman et al. |
| 6,448,669 B1 | | 9/2002 | Elder |
| 6,516,739 B2 | | 2/2003 | Bartels et al. |
| 6,622,483 B2 | | 9/2003 | Denniss |
| 6,647,716 B2 | | 11/2003 | Boyd |
| 6,711,897 B2 | | 3/2004 | Lee |
| 6,731,019 B2 | | 5/2004 | Burns et al. |
| 6,756,695 B2 | | 6/2004 | Hibbs et al. |
| 6,768,216 B1 | | 7/2004 | Carroll et al. |
| 6,768,217 B2 | | 7/2004 | Chalmers et al. |
| 6,772,592 B2 | | 8/2004 | Gerber et al. |
| 6,790,007 B2 | | 9/2004 | Gingras et al. |
| 6,840,738 B1 | | 1/2005 | Swanberg |
| 6,864,597 B1 | | 3/2005 | Ricker |
| 6,872,045 B1 | * | 3/2005 | Weaver et al. ................ 415/4.2 |
| 6,884,020 B2 | | 4/2005 | Kaare, Jr. et al. |
| 6,948,910 B2 | * | 9/2005 | Polacsek ....................... 416/1 |
| 2002/0078687 A1 | | 6/2002 | Donnelly |

OTHER PUBLICATIONS

Bose, Neil et al., "Experimental Performance of a Trochoidal Propeller With High-Aspect-Ratio Blades" *Marine Technology*, vol. 26, No. 3 (Jul. 1989) pp. 192-201.

Brockett, Terry, "Hydrodynamic Analysis of Cycloidal Propulsors", The Society of Naval Architects and Marine Engineers, Presented at Propellers/Shafting '91 Symposium, Virginia Beach, Virginia (Sep. 17-18, 1991) pp. 2-1 to 2-28.

Brulle, Robert V., "Giromill Wind Tunnel Test & Analysis" *Proceedings of the Third Wind Energy Workshop*, (Sep. 19-21, 1977) Washington, D.C., pp. 775-793.

Chopra, M.G., "Large Amplitude Lunate-tail Theory of Fish Locomotion" *J. Fluid Mech.* (1976), vol. 74, part I, pp. 161-182.

Chopra, M.G., "Hydromechanics of Lunate-tail Swimming Propulsion", *J. Fluid Mech.* (1974) part 2, pp. 375-391.

Drees, H.M., "The Cycloturbine and its Potential for Broad Application", Second International Symposium on Wind Energy Systems, Amsterdam, Netherlands, (Oct. 3-6, 1978) pp. E7-81 to E7-88.

Evans, F.C., "Practical Considerations in the Design of a Vertical-Axis Windmill" Second International Symposium on Wind Energy Systems, Amsterdam, Netherlands, (Oct. 3-6, 1978) pp. Z56-Z59.

Fraenkel, P.L., "Power from Marine Currents", *Proc. Instn. Mech. Engrs.*, vol. 216, Part A: J. Power and Energy (2002).pp. 1-14.

Furukawa, Akinori et al., "An Approximate Method for Estimating the Blade Performance of Darrieus-Type Cross-Flow Water Turbines" *Memoirs of the Faculty of Engineering*, Kyushu University, Fukuoka, Japan, vol. 52, No. 2 (Jun. 1992) pp. 131-144.

Furukawa, Akinori et al., "Theoretical Considerations in an Approximate Method for Estimating the Blade Performance of a Darrieus-Type Cross-Flow Water Turbine" *Memoirs of the Faculty of Engineering*, Kyushu University, Fukuoka, Japan, vol. 50, No. 1 (Mar. 1990) pp. 1-14.

Greenblatt, David, "Management of Vortices Trailing Flapped Wings via Separation Control" American Institute of Aeronautics and Astronautics, 43rd AIAA Aerospace Sciences Meeting and Exhibit (Jan. 10-13, 2005) Reno, Nevada, pp. 1-22.

Greenblatt, David et al., "Effect of Leading-Edge Curvature and Slot Geometry on Dynamic Stall Control", 1st AIAA Flow Control Conference St. Louis, MO (Jun. 24-26, 2002) pp. 1-19.

Grylls, W. et al., "A Theoretical and Experimental Investigation into the Variable Pitch Vertical Axis Wind Turbine" Second International Symposium on Wind Energy Systems, Amsterdam, Netherlands (Oct. 3-6, 1978) pp. E-9-101 to E9-118.

Healey, J.V., "A Simple Tandem Disk Model for a Cross-Wind Machine" *Wind Engineering*, vol. 6, No. 3 (1982) pp. 156-165.

Hirsch, I.H. et al., "A Cascade Theory for the Aerodynamic Performance of Darrieus Wind Turbines" *Wind Engineering*, vol. 11, No. 3, (1987) pp. 164-175.

Holme, O., "A Contribution to the Aerodynamic Theory of the Vertical-Axis Wind Turbine" International Symposium on Wind Energy Systems, St. John's College, Cambridge, England (Sep. 7-9, 1976) pp. C4-55 to C4-72.

Jones, Kevin D. et al., "An Investigation of the Fluid-structure interaction in an oscillating-wing micro-hydropower generator" Dept. of Aeronautics and Astronautics, Naval Postgraduate School, Monterey, California, (2002) pp. 1-10.

Jones, Kevin D. et al., "On Flow Separation Control by Means of Flapping Wings" *Biomechanisms of Swimming and Flying*, Springer Publishing, Editors: Naomi Kato et al., Chapter 5 (2004).

Jurgens, Dirk et al., "New Hydrodynamic Aspects of Double Ended Ferries With Voith-Schneider Propeller" Second International Conference on Double Ended Ferries, Alesund, Norway (Mar. 10-12, 2003) pp. 1-11.

Kiho, S. et al., "The Power Generation from Tidal Currents by Darrieus Turbine" Dept. of Electrical Engineering, Nihon University, Tokyo, Japan (1996) pp. 1242-1245.

Kim, Seung Jo et al., "Design and Performance Test of Cycloidal Propulsion Systems" American Institute of Aeronautics and Astronautics, AIAA 2003-1786 (Apr. 7-10, 2003) Norfolk, VA pp. 1-11.

Kim, Seung Jo et al., "Design and Development of Unmanned VTOL, Cyclocopter" Seoul National University, Korea, (2004) pp. 1-6.

Kinsey, T. et al., "Aerodynamics of Oscillating Wings and Performance as Wind Turbines" American institute of Aeronautics and Astronautics, AIAA 2005-5094, Ontario, Canada (Jun. 6-9, 2005) pp. 1-15.

Kirke, Brian, "Developments in Ducted Water Current Turbines" Griffith University, Australia, (Aug. 16, 2003) pp. 1-12.

Kirke, Brian, "Evaluation of Self-starting Vertical Axis Wind Turbines for Stand-alone Applications" Griffith University, Australia (Apr. 1998), pp. iii-338.

Kirsten, Frederick, "A New Type of Propeller", *SAE Journal* (Jan. 1928) vol. XXII, No. 1, pp. 77-80.

Klimas, Paul C. et al., "Four Aerodynamic Prediction Schemes for Vertical-Axis Wind Turbines: A Compendium" Sandia Laboratories, (Jun. 1978) SAND78-0014, pp. 3-20.

Lee, Jung-Sang et al., "The Modifications of Airfoil Shape for Optimal Aerodynamic Performance on Flapping-Airfoil in Low-Reynolds Number Flow" American Institute Aeronautics and Astronautics 41$^{st}$ Aerospace Sciences Meeting and Exhibit (Jan. 8-9, 2003) Reno, Nevada AIAA 2003-421, pp. 1-9.

Mandel, A.C. et al., "The Effects of Dynamic Stall and Flow Curvature on the Aerodynamics of Darrieus Turbines Applying the Cascade Model" *Wind Engineering*, vol. 18, No. 6, pp. 267-282 (1994).

Mays, I.D. et al., "The Evolution of the Straight-bladed Vertical Axis Wind Turbine" Proc. Brit. Wind Energy Assoc. Conf., London, (Mar. 22-24, 1988) pp. 187-194.

Mays, I. et al., "Performance of the Variable Geometry Vertical Axis Wind Turbine at High and Low Solidities" 1$^{st}$ BWEA Workshop (Apr. 1979) pp. 48-56.

Modi, V.J. et al., "On the Performance of the Savonus Wind Turbine" *Journal of Solar Engineering* (Feb. 1989) vol. 111, pp. 71-81.

Nilsson, K. et al., "Simulation of Direct Drive Generators Designed for Underwater Vertical Axis Turbines" 5$^{th}$ European Wave Energy Conference, Cork, Ireland (Sep. 17-20, 2003) pp. 1-6.

Obabko, Aleksandr V. et al., "Detachment of the Dynamic-Stall Vortex Above a Moving Surface" American Institute of Aeronautics and Astronautics, 31$^{st}$ AIAA Fluid Dynamics Conference & Exhibit, Anaheim, California (Jun. 11-14, 2001) AIAA 2001-2711, pp. 1-12.

Onda, Masahiko et al., "Cycloidal Ropeller and its Application to Advanced LTA Vehicles" American Institute of Aeronautics and Astronautics 3$^{rd}$ Annual Aviation Technology, Integration and Operations (ATIO) Tech, Denver, Colorado (Nov. 17-19, 2003) AIAA 2003-6832, pp. 1-6.

Riijarvi, Tommi et al., "Experimental Performance and Comparison of Performance Prediction Methods for a Trochoidal Propeller Model" *Int. Shipbuilder Prog.* vol. 41, No. 426 (1994) 113-136.

Ruys, A.W., "A Comparison of Some Published Results of Tests on Vertical Axis Propellers" *Int. Shipbuilder Progress*, vol. 13, (Dec. 1966) pp. 399-401.

Sheldahl, Robert E. et al., "Aerodynamic Performance of a 5-Metre-Diameter Darrieus Turbine With Extruded Aluminum NACA-0015 Blades" Sandia National Laboratories, (Mar. 1989) SAND80-0179, pp. 3-41.

Sparenberg, J.A., "On the Efficiency of a Vertical-Axis Propeller", Third Symposium Naval Hydrodynamics, Scheveningen, Netherlands (1960) pp. 45-66.

Sparenberg, J.A. et al., "On the Optimum One-bladed Cycloidal Ship Propeller" *Journal of Engineering Mathematics*, (Jan. 1969) vol. 3, No. 1, pp. 1-20.

Staelens, Yann et al., "A Straight-Bladed Variable-pitch VAWT Concept for Improved Power Generation" American Institute of Aeronautics and Astronautics 41$^{st}$ Aerospace Sciences Meeting and Exhibit, Reno, Nevada (Jan. 6-9, 2003) AIAA 2003-524.

Strickland, J.H., "A Performance Prediction Model for the Darrieus Turbine" BHRA Fluid Engineering, International Symposium on Wind Energy Systems, Cambridge, England (Sep. 7-9, 1976) pp. C3-39.to C3-54.

Takamatsu, Yasuo et al., "Study on Hydrodynamic Performance of Darrieus-type Cross-flow Water Turbine" Bulletin of JSME, (Jun. 1985) vol. 28, No. 240, pp. 1119-1127.

Vandenberghe, D. et al., "Optimum Pitch Control for Vertical Axis Wind Turbines" *Wind Engineering* (1987) vol. 11, No. 5, pp. 237-247.

Vandenberghe, D. et al., "A Theoretical and Experimental Investigation into the Straight Bladed Vertical Axis Wind Turbine With Second Order Harmonic Pitch Control" *Wind Engineering* (1986) vol. 10, No. 3, pp. 122-138.

Van Manen, J., "Results of Systematic Tests With Vertical Axis Propellers" *International Shipbuilding Progress*, (Dec. 1966) vol. 13, pp. 382-398.

Van Manen, J. et al., "A New Way of Simulating Whale Tail Propulsion" The National Academy of Sciences, 21$^{st}$ Symposium on Naval Hydrodynamics (1997) pp. 946-958.

Voith-Schneider Propeller (VSP) product brochure, Germany, 4 pages.

Voith-Schneider Propeller Types and Dimensions, Germany, 4 pages.

Von Ellenrieder, Karl D. et al., "Visualization of the Three Dimensional Flow Behind Oscillating Foils" American Institute of Aeronautics and Astronautics 40$^{th}$ AIAA Aerospace Sciences Meeting and Exhibit, Reno, Nevada, (Jan. 14-17, 2002) AIAA 2002-0696, pp. 1-6.

Yuan, Weixing et al., "Low-Reynolds-Number Unsteady Turbulent Flows Past Oscillating Wings at Angles of Attack Near Stall" American Institute of Aeronautics and Astronautics, 42$^{nd}$ AIAA Aerospace Sciences Meeting and Exhibit, Reno, Nevada (Jan. 5-8, 2004) pp. 1-10.

* cited by examiner ly known propellers generally employ blades that are aerodynamically shaped with cross sections or foils commonly referred to airfoils or hydrofoils depending on the fluid.

VORTEX SHEDDING CYCLICAL PROPELLER

BACKGROUND

Propellers and turbines can transfer shaft power to a fluid or extract power from a moving fluid. (Herein, the term propeller is used in the generic sense to include structures used for propulsion and for extracting energy from a moving fluid.) Currently known propellers generally employ blades that are aerodynamically shaped with cross sections or foils commonly referred to airfoils or hydrofoils depending on the fluid. The foils can produce a force commonly referred to as lift that enables the desired energy transfers. However, the foils also produce drag that transfers energy to unwanted forms such as heat. Extensive efforts have been spent on designing foils that produce as much lift as possible while creating as little drag as possible. A particular problem to be solved in this optimization process is to keep the flow attached to the surface of the foil at high angles of attack in order to achieve high lift coefficients. While attached, the resulting flow around the foil features streamlines that are mainly parallel to the surface of the foil. Equation 1 shows how the lift force $F_L$ produced by a foil depends on parameters such as the fluid density $\rho$, the flow velocity v, the lift coefficient $C_L$ of the foil, and the active area A of the foil. Foil design is generally concerned with optimizing the lift coefficient $C_L$, which may be a function of the flow velocity v. The flow velocity v can be described using a non-dimensional parameter known as Reynolds number $N_R$ as shown in Equation 2, where $L_C$ is the foil cord length and $\mu$ is the kinematic viscosity of the fluid.

$$F_L = \frac{\rho v^2}{2} \cdot C_L \cdot A \quad \text{Equation 1}$$

$$N_R = \frac{L_C v}{\mu} \quad \text{Equation 2}$$

The lift coefficient $C_L$ in Equation 1 is generally proportional to the attack angle of the foil until the foil begins to stall. The attack angle indicates the angle between the relative direction of the fluid flow and the foil's baseline (e.g., the line from the leading edge to the trailing edge of a simple foil.) Stalling results from the tendency of fluid flow to separate from the upper or back side of the foil causing the lift coefficient $C_L$ to drop when the attack angle becomes too large. Accordingly, the stall angle, which is the attack angle corresponding to stall, is the angle of attack where the lift coefficient $C_L$ is largest. Stall limits the performance of known propellers since beyond stall the foil will have greatly increased drag, as well as decreased lift. Further, the stall angle generally decreases with decreasing fluid velocity, so that the maximum lift that a foil can produce generally drops with the fluid velocity. These effects pose a problem for applications where power is to be efficiently transferred to or from a fluid at low flow speeds.

Varying the attack angle can temporarily produce dynamic lift coefficients that are larger than the maximum lift coefficient $C_L$ that can be achieved when a foil is held statically at a given angle of attack. This effect is known as dynamic lift since it involves dynamically changing the angle of attack of the foil. FIG. 1 shows a plot 110 of the lift coefficient $C_L$ of a foil held stationary at different attack angles in a range between the positive and negative stall angles. In contrast, plot 120 shows the lift coefficient $C_L$ of the same foil as the attack angle of the foil oscillates between positive and negative attack angles that are greater than the stall angles. FIG. 1 demonstrates that dynamic lift coefficients can be more than an order of magnitude larger than the static maximum static lift coefficient.

Dynamic stall vortices are believed to cause of the larger lift coefficients $C_L$ associated with dynamic lift. In particular, the separating fluid flow near the leading edge of a foil 210 as shown in FIG. 2 can form a vortex 220 in the fluid when foil 210 rotates in a direction 230. Vortex 220 provides a region of low pressure, which increases the lift coefficient of foil 210. However, if foil 210 is kept at a stationary relative to the fluid flow v, the fluid flow v will move vortex 220 along the surface of foil 210, and the increase in lift will disappear once vortex 220 moves past the trailing edge of foil 210. The dynamic increase in lift can thus only be achieved temporarily during a pitching cycle when foil 210 is being rotated. Once foil rotation stops, the lift coefficient falls to the lower static lift coefficient shown by curve 110 in FIG. 1.

U.S. Pat. No. 1,835,018 issued in 1937 to G. J. M. Darrieus discloses a propeller with cyclical thrust generation. FIG. 3 shows one such propeller 300 that mechanically varies the pitch angles of blades 310 as described in U.S. Pat. No. 1,835,018. Propeller 300 has blades 310 with pivot axes 320 running along the perimeter of a cylinder having a central shaft 330. A mechanism 340 driven by shaft 330 and attached to blades 310 cyclically changes the pitch of the blades, i.e., the angle between each blade 310 and a line extending from shaft 330 to the pivot 320 of the blade 310. In propeller 300, the variation of the attack angle of blades 310 gives propeller 300 a direction of thrust when blades 310 are all submerged in the fluid. However, mechanism 340, which controls the orientation of blades 310, can only be optimized for a very limited set of operating parameters, e.g., fluid velocity v and fluid density $\rho$. Further, propeller 300 and other current variable pitch propellers have fluid flow that remain attached to the foils at all times, independent of the type of blade pitch control employed. Accordingly, such propellers are unable to achieve the high lift coefficients associated with dynamic lift. This limits the use and efficiency of such propellers at low flow speeds.

SUMMARY

In accordance with an aspect of the invention, a propeller that can extract kinetic energy from a moving fluid or transfer kinetic energy to a fluid to produce thrust or create fluid motion, employs pitch changes of one or more blades in order to produce free vortices in the fluid. The propeller can thus achieve the high lift coefficients associated with dynamic lift. The pitch changes may further be adaptable so that the process of changing the attack angle can adapt according to current operating parameters such as propeller rotational velocity and free flow fluid velocity to optimize energy transfer efficiency. Embodiments of the propeller are particularly suited for low flow speeds, where the effects of low Reynolds number induced flow separation on the blades make other propellers inefficient.

In the case of energy extraction from the fluid, the fluid flow preferably rotates the propeller, while the pitch changes during propeller rotation may exceed the static stall angle and are of sufficient magnitude to shed vortices and create dynamic lift. In one specific embodiment, the shedding of vortices creates a flow pattern known as von Karman vortex street, and the resulting time averaged flow field distant from the propeller is that of a wake flow. The induced rotation may drive any shaft driven device such as a pump or an electrical generator.

In the case of momentum transfer to the fluid, the dynamic pitch changes during driven rotation may exceed the static stall angle and are of sufficient magnitude to shed vortices. In one specific embodiment, the shedding of vortices creates a flow pattern that is the inverse to the von Karman vortex street. The resulting time averaged flow field distant from the propeller in this configuration is that of a jet that efficiently produces thrust.

In another aspect of the invention, a propeller device employs unsteady aerodynamic effects, in order to transfer power efficiently to or from a fluid. While most advantageous at low Reynolds numbers, the propeller device can be employed at all flow speeds. Potential applications include but are not limited to propulsion solutions for mini and micro air vehicles, ocean tidal flow and wave power extraction, river and stream current power extraction, and efficient low wind speed wind power generation.

BRIEF DESCRIPTION OF THE DRAWINGS

Use of the same reference symbols in different figures indicates similar or identical items.

DETAILED DESCRIPTION

In accordance with an aspect of the invention, a propeller used to transfer energy to or from a fluid employs pitching blades in order to use the large dynamic lift coefficients that result from shedding of vortices during dynamic pitching. The pitching can provide efficient energy transfers even at low fluid flow rates and can be adapted to changing conditions.

Figure 4:
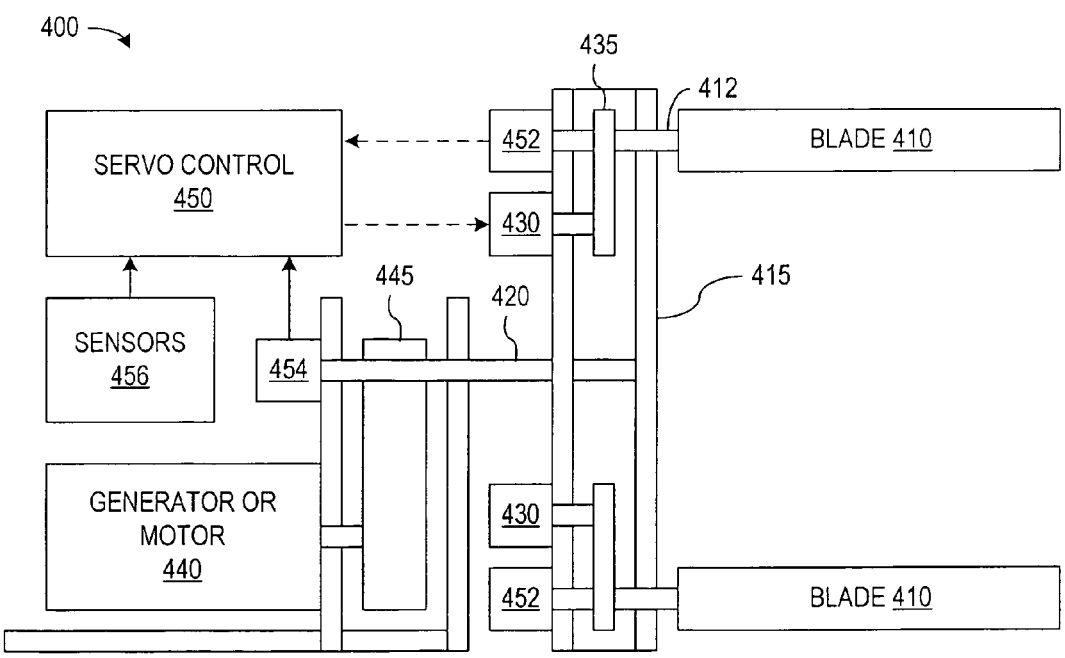
FIG. 4 is a block diagram illustrating a propeller system in accordance with an embodiment of the invention.

FIG. 4 illustrates a propeller system 400 in accordance with an exemplary embodiment of the invention. Propeller system 400 uses blades 410 having a size and number that may be selected according to the desired power transfer by propeller system 400. In operation, one or more of blades 410 will be at least partially submerged or surrounded by a fluid such as water or air to or from which energy is to be transferred, and the average direction of fluid flow is preferably perpendicular to blade shafts 412. Each blade 410 has a cross-section that is selected to provide a foil having the characteristics required for the target fluid. In general, any type of foil can be employed for blades 410, but the type of foil may influence the particular pitch variation process employed in system 400 as described further below. At low flow speeds, the particular foil shape used becomes less important, and as described further below, with the proper pitching cycle, even flat plates can perform well as blades 410.

System 400 uses an offset mounting of blades 410 so that blades 410 are mounted at one or both ends on a disk or other base 415 at respective radial offsets from a main shaft 420 of propeller system 400. Each blade 410 has a pivot mounting that permits controlled rotation of the blade 410 for example, by a corresponding servo motor system 430. Servo motor system 430 may be constructed using a variety of systems including but not limited to an AC or DC servo motor or a hydraulic or pneumatic motor. Each servo system 430 allows a corresponding blade 410 to be rotated with respect to base 415. In the embodiment of FIG. 4, each servo system 430 uses an associated mechanism 435 such a transmission, gear system, a belt and pulley system, or the like to rotate a shaft 412 of the corresponding blade 410, and an angular position sensor 452 providing a signal indicating the angle of the blade 410 relative to base 415 can be connected to the shaft 412 of the blade 410. Alternatively, a direct drive system is also possible, where the shaft of the servo motor 430 is directly attached to shaft 412 without a transmission or other mechanism 435.

Base 415 is attached to a main shaft 420 and provides a linkage to blades 410, so that base 415 and main shaft 420 conduct the energy transfer between blades 410 and a device 440, which may be, for example, a generator or motor. In the embodiment of FIG. 4, an optional transmission such as a single stage gear system or similar mechanical drive system 445 is between main shaft 420 and device 440, but alternatively, device 440 may be directly coupled to main shaft 420. Device 440 is generally selected according the direction of energy transfer and the task that system 400 performs. For the example, when system 400 extracts energy from a moving fluid, device 440 may be a generator, pump, or other device receiving drive power resulting from the action of the moving fluid on blades 410 during a pitching process. In this case, the lift from blades 410 during the pitching process creates a toque that turns base 415, main shaft 420, and mechanism 445 to drive the device 440, e.g., for electrical power generation or other useful work. Alternatively, device 440 can be a motor that drives main shaft 420 to turn base 415, so that blades 410 act on the fluid, for example, during a pitching process to create thrust for propulsion or to create a flow in the fluid.

Both main shaft 420 and blade shafts 412 feature respective angular position sensors 454 and 452 that determine the respective orientations of shafts 420 and 412. Additional sensors 456 can be used to sense properties of the fluid such as the average speed and direction of free fluid flow, so that at any point in time, a servo control system 450 that controls servo motors 430 can determine the desired pitching schedule of each blade 410 relative to the flow field. Sensors 452 and 454 can be implemented using standard system such as resolvers, tachometers, or encoders of any kind. Sensors 456 can measure any desired characteristic of the fluid including but not limited to measuring the fluid flow direction and magnitude. The flow field for example would preferably be oriented in any direction normal to main shaft 420 and can be measured using an anemometer of any kind and/or a weather vane type device. In limited applications, e.g., when extracting energy from a steady stream of known direction and magnitude, sensors 456 may not be needed and may be eliminated from system 400.

Servo control system 450 can be implemented using application specific hardware or a general purpose processing system programmed to select and implement a pitching schedule for varying the attack angles of blades 410. Servo control system 450 can be attached to base 415 or be separate from base 415 and communicate with systems 430 and 452 on rotating base 415 via wired or wireless connections. In particular, servo control system 450 can use the information transmitted from sensors 452, 454, and 456 to determine a pitching schedule, direct servo motor systems 430 to individually vary the pitches of respective blades 410, and monitor angular sensors 452 and 454 to determine whether blades 310 are pitching as required to generate a desired vortex shedding pattern in the fluid. As described further below, the desired vortex shedding pattern generally depends on whether energy is being extracted from or applied to the fluid.

While the example system of FIG. 4 shows an electronic control system 450 that adjusts the pitch schedules, control systems may employ mechanical linkages or other means of actuation, like hydraulic or pneumatic actuators, to achieve a pitching cycle that varies the attack angle of blades 410 sufficiently to shed vortices and achieve high dynamic lift coefficients.

Figure 5:
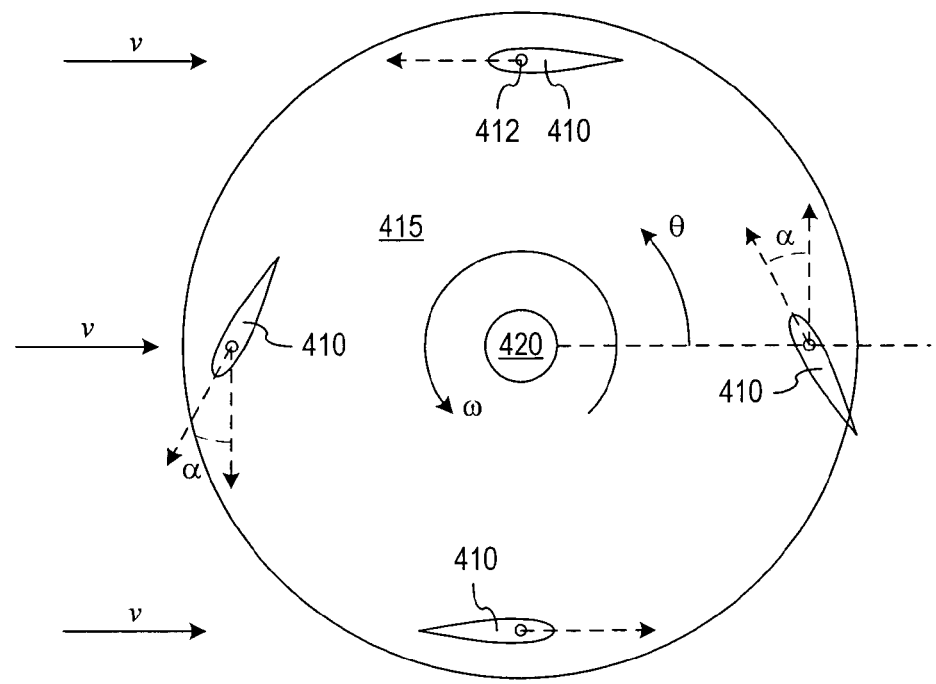
FIG. 5 illustrates parameters of motion of a propeller that in accordance with an embodiment of the invention can be independently controlled and adapted to transfer energy using dynamic lift.

Propeller system 400 as described above has at least one blade that is mounted eccentrically to a main shaft 420. A propeller having a single blade 410 is easier to analytically analyze since the wake field of one blade in a multi-blade propeller can affect the flow at other blades. FIG. 5 shows four positions of a single blade 410 on base 415 with a view along the direction of main shaft 420. Blade 410 can be rotated as described above with respect to base 415 and shaft 420. In FIG. 5, a blade angle $\alpha$ defines the relative angle of a blade 410 to the tangent of the circle that blade shaft 412 follows as base 415 and main shaft 420 rotate. A rotation angle $\theta$ defines the position of blade 410 as base 415 rotates. For example, FIG. 5 shows blade 410 at positions where rotation angle $\theta$ is 0, 90°, 180°, and 270°.

The attack angle of blade 410 generally depends on blade angle $\alpha$, rotation angle $\theta$, an angular velocity $\omega$ of base 420, and the direction and velocity of free stream fluid flow v. More specifically, the orientation of the base line of a foil of blade 410 depends on angles $\alpha$ and $\theta$. The fluid velocity at the foil, which is a vector sum of the blade velocity and the free stream fluid flow v, depends on free stream fluid flow v, rotation angle $\theta$, and an angular velocity $\omega$ of base 415. However, if the free stream fluid velocity v is small when compared to the rotational velocity of a blade 410, the attack angle of a blade 410 is approximately equal to angle $\alpha$, and the pitching schedule for extracting energy from a constant free stream fluid flow or for momentum transfer in a specific can be a function rotation angle $\theta$. Accordingly, for a low fluid velocity, mechanical linkages, gears or an active servo system with a fixed pitching schedule can vary blade angle $\alpha$ as a function of rotation angle $\theta$, which has a defined relation to the background fluid flow vector v.

Figure 3:
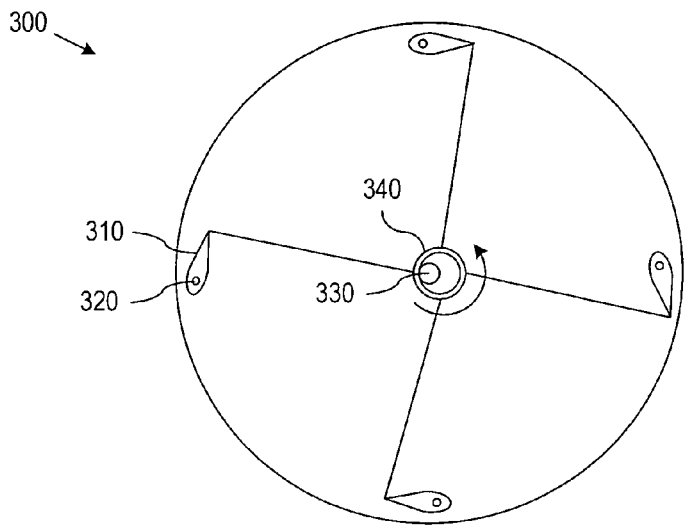
FIG. 3 shows a known propeller including a mechanism that cyclically changes the attack angles of blades mounted transverse to a fluid flow.
Figure 6:
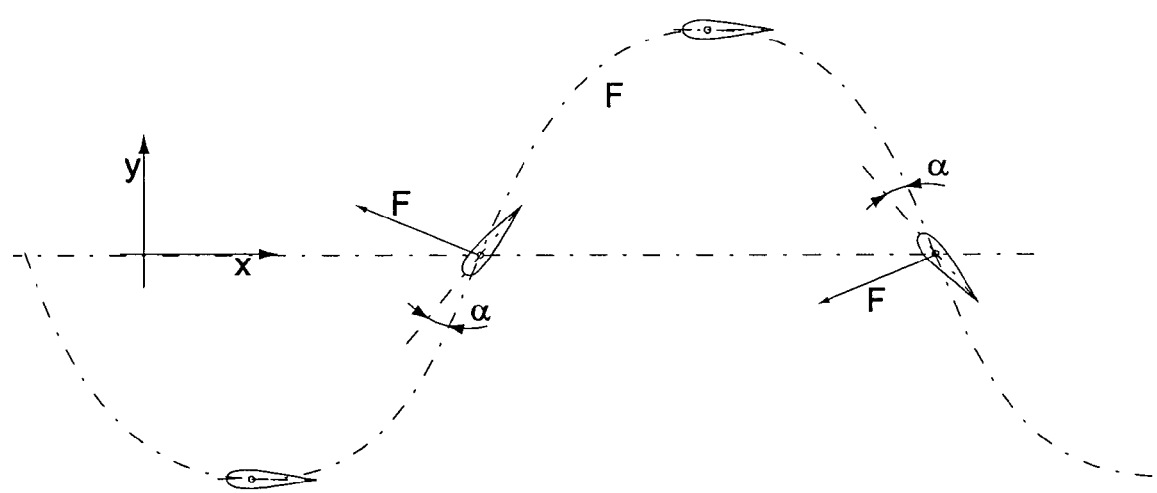
FIG. 6 illustrates the path and attack angle of a single blade during operation of a propeller in accordance with and embodiment of the current invention.

One pitching schedule for low fluid velocities sinusoidally varies blade angle $\alpha$ with a frequency equal to the rotational frequency of base 415. This causes blade 410 to perform a combined pitching and plunging motion with respect to the flow, leading to an oscillatory blade path as shown in FIG. 6. To achieve dynamic lift and shed vortices, the amplitude of the pitching schedule is such that the angle of attack of blade 410 exceeds the stall angle twice during each rotation of base 415. Accordingly, the pitch control system must be able to vary the blade angle by amounts sufficient to create dynamic stall vortices. In contrast, a linkage of the type shown in FIG. 3 only allows for small angular angle of attack changes of the blade with respect to the tangent direction. Such small changes are sufficient to perform energy transfers when the Reynolds number is large and the desired flow pattern is that of attached flow, but do not produce dynamic stall vortices and the high efficiency provided by dynamic lift.

The single blade configuration illustrated in FIG. 6 provides lift forces F and moments that are periodic with twice the rotational frequency for a propeller with a single blade. During the oscillations, torque varies between zero at the shaft when the propeller blade is at its upper or lower position, e.g., at $\theta=90°$ or $270°$ and $\alpha=0$, to the maximum torque when blade 410 reaches the greatest blade angle and shedding of vortices reaches maximum strength, e.g., at $\theta=0°$ or $180°$ and the magnitude of $\alpha$ is greater than the stall angle. A steadier torque may be provided by adding more blades, but careful consideration needs to be paid to scheduling the vortex shedding so that individual vortices from different blades do not cancel each other as they travel downstream.

Sinusoidal pitch variation such as previously described is only one example of a pitching schedule. More generally, a propeller system such as system 400 of FIG. 4 can measure fluid properties and/or angular velocity of base 415 and adjust the pitching schedule for current conditions, for example, to change the amplitude or time dependence of the variation of blade angle $\alpha$ to adapt to changes in free stream fluid flow direction or speed. In general, an adaptable pitching schedule is easiest to implement using an electronic servo control system such as illustrated in FIG. 4.

Figure 1:
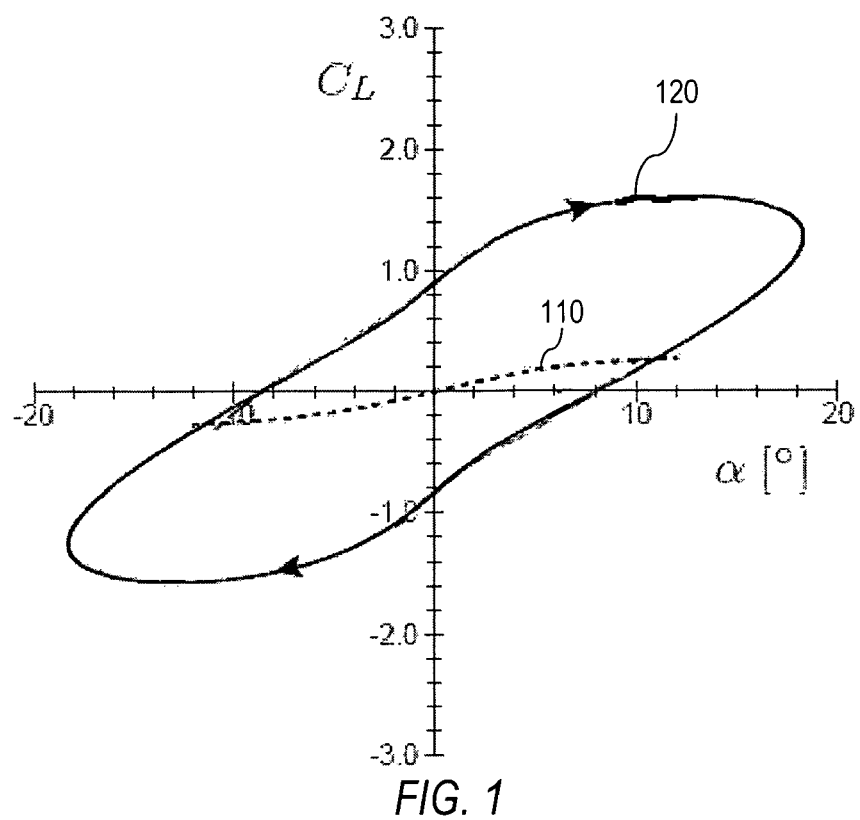
FIG. 1 shows plots of the lift coefficient of a single propeller blade as a function of angle of attack for static attack angles and for an angle of attack that varies sinusoidally in combination with a sinusoidal heaving motion.
Figure 2:
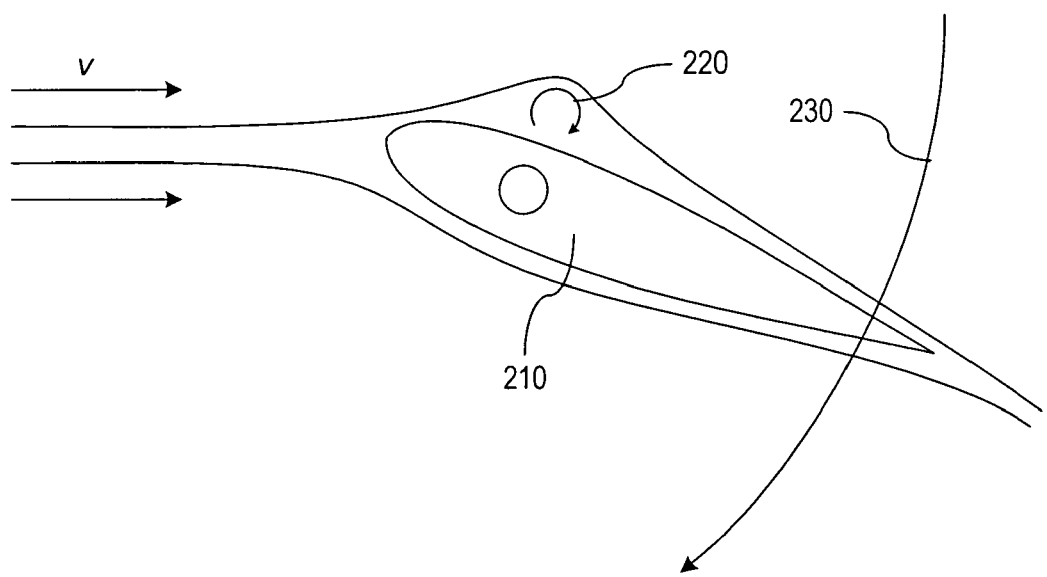
FIG. 2 illustrates the formation of dynamic stall vortices when the attack angle of a foil increases beyond the stall angle.

The resulting pitching and plunging action of the selected pitching schedule of blades 410 can cause vortex shedding from blades 410 in a pattern precisely defined in space and time. In general, vortex shedding occurs as a result of pitching a foil past its stall angle of attack, at which point separation will occur as described above and illustrated in FIG. 2. FIG. 2 shows that for a positive (clockwise) angle of attack of the foil 210 in a moving fluid, a clockwise rotating vortex 220 forms on the upper side of foil 220. This vortex 220 will then be swept downstream with the mean fluid flow towards the trailing edge of foil 210, entering the wake of foil 210. Similarly, a negative angle of attack will produce a counter clockwise rotating vortex on the bottom side of the foil. Accordingly, a propeller system 400 that causes blades 410 to oscillate between extremes that are greater than the stall angle of attack while extracting energy from a fluid flow will generate a vortex pattern such as shown in FIG. 7.

Propeller 400 can efficiently extract energy from the fluid when the pattern of shed vortices forms a pattern known as the von Karman Vortex Street. In general, the pitching schedule required to produce a von Karman Vortex Street pattern depends on various operating parameters such as the fluid flow speed and rotational speed of the propeller, but the pitching schedule should always be oscillatory. Similarly, the pitch schedule of the foils needs to be controlled precisely to achieve the desired vortex shedding pattern. The left side of FIG. 7 illustrates uniform flow field incident on propeller system 400. Propeller system 400 interacting with the flow field creates the von Karman Vortex street wake pattern and causes a net transfer of flow momentum to propeller system 400, such that the time averaged flow field is that of a wake flow, shown on the right side of FIG. 7. The momentum transfer causes the propeller to turn in the indicated direction, making torque and therefore shaft power available at the main shaft. This shaft power can subsequently be used to drive devices like generators or pumps. This operating mode can therefore be that of a windmill or watermill.

It should be noted that, a mill in accordance with an embodiment of the invention can be self starting provided the proper angles of attack are set by mechanical or other means. In particular, a programmable control system such as servo control system 400 in FIG. 4 can orient the blades so that the current fluid flow causes torque, at which point the propeller will start rotating and variation of the blade angles can begin. Further, the self starting ability works even for a single blade located in any angular position of rotation.

Figure 7:
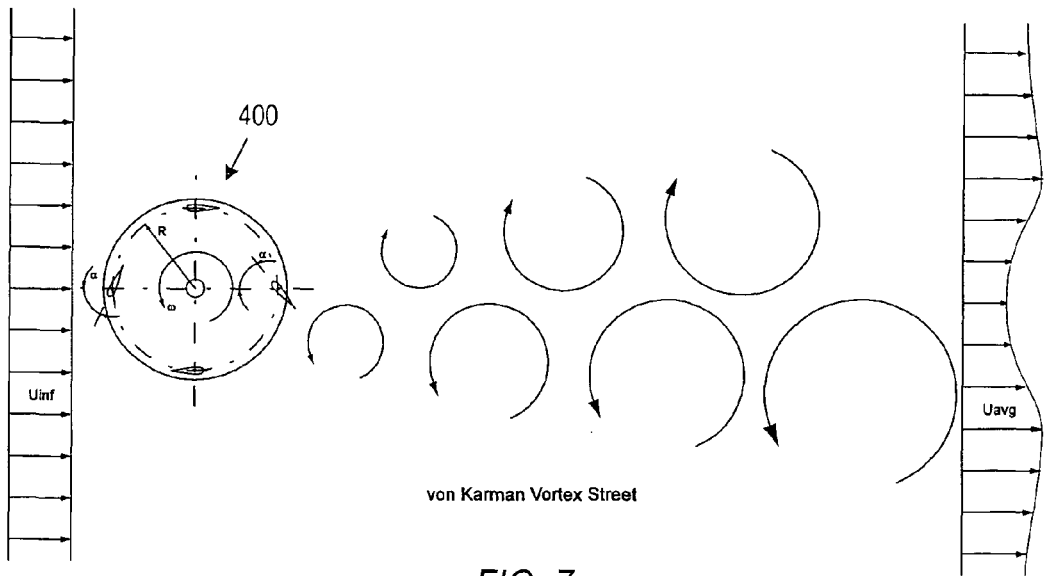
FIG. 7 illustrates the shedding of vortices during operation of a propeller in accordance with an embodiment of the invention when the propeller is employed to extract energy from a moving fluid.

The momentum deficit due to energy extraction as illustrated by the flow profiles before and after propeller system 400 in FIG. 7 imposes a net force in the downstream direction on propeller system 400. The mounting structure of propeller system must be able to withstand this force.

Figure 8:
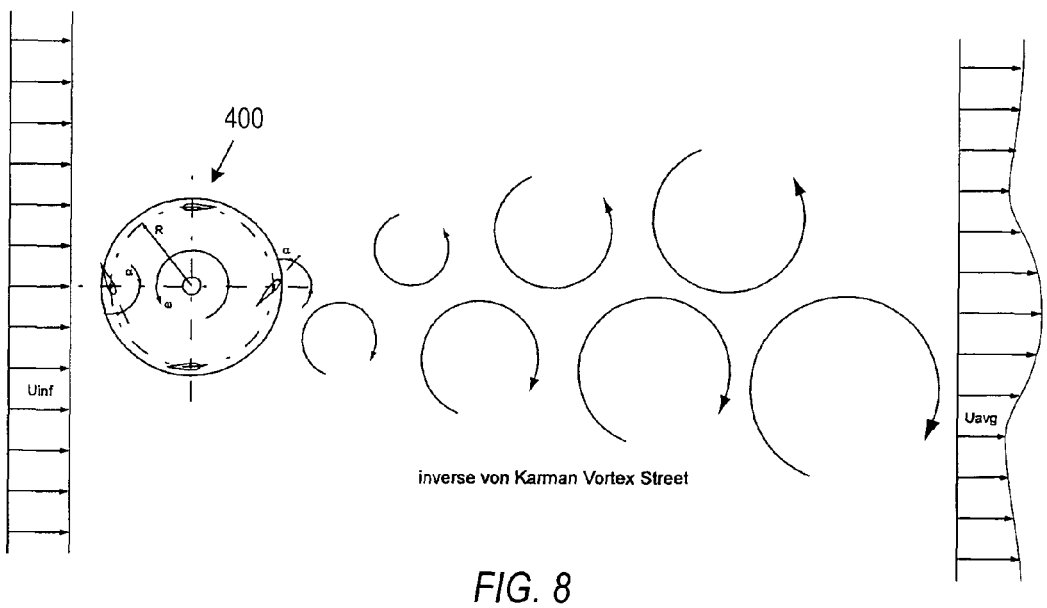
FIG. 8 illustrates the shedding of vortices when a propeller in accordance with an embodiment of the invention is driven to produce thrust in a fluid.
Figure 9:
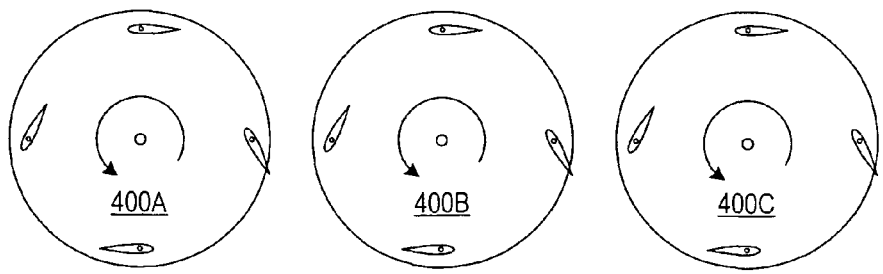
FIG. 9 shows a system in accordance with an embodiment of the invention including multiple vortex shedding propellers in a cascade configuration to fluid flow or pressure.

FIG. 8 shows the inverse operating mode of propeller system 400, where thrust is generated. In FIG. 8, propeller 400 operates in propeller mode, with a time averaged jet type flow resulting. The flow is preferably the inverse of the von Karman vortex street. Inverse refers to the fact that the rotation direction of the vortices is the opposite of those shown in FIG. 7. Propeller 400 in this use will experience a net force in the upstream direction, but a motor or engine of some sort needs to provide shaft power to maintain rotation of propeller 400. While a typical application of this operating mode is thrust generation in order to propel land, air or watercraft, propeller 400 can also be used as a fan device in order to deliver an fluid current for heating, cooling or pneumatic transport of particles, as well as providing a pressure rise like in any air or gas compressor. For the latter purpose, several of these propellers 400A, 400B, and 400C may be cascaded in order as shown in FIG. 9 to increase the overall pressure rise.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A propeller system comprising:
a shaft;
a blade having an attack angle that is adjustable;
a linkage connecting the blade to the shaft in an eccentric fashion;
a sensor that measures a property of a fluid interacting with the propeller system; and
a control system that varies the attack angle in a manner that is selected to cause the blade to shed one or more dynamic stall vortices during each revolution of the shaft, wherein the control system selects, based on a measurement from the sensor, the manner of varying the attack angle to shed said one or more dynamic stall vortices.

2. The system of claim 1, further comprising a plurality of blades, wherein the blades respectively have adjustable attack angles, and the control system varies the attack angles so that each blade sheds one or more dynamic stall vortices during each revolution of the shaft.

3. The system of claim 1, further comprising a motor that drives the shaft, wherein action of the at least one blade transfers momentum to a fluid.

4. The system of claim 1, further comprising a device that receives from the shaft energy extracted by action of a fluid on the at least one blade.

5. The system of claim 1, wherein the linkages comprise:
a base affixed to the shaft; and
a blade shaft rotatably mounted on the base.

6. The system of claim 5, further comprising a servo motor connected to rotate the blade shaft, wherein the control system controls the servo motor.

7. The system of claim 1, further comprising an angle sensor coupled to measure a rotation angle of the linkage.

8. The system of claim 1, further comprising an angle sensor coupled to measure a rotation angle of the blade.

9. The system of claim 1, wherein the sensor comprises a flow sensor coupled to measure flow of the fluid interacting with the propeller system.

10. The system of claim 1, wherein the control system comprises a mechanical system that causes the attack angle of the blade to exceed a stall angle of the blade at one or more angle of rotation of the linkage about the shaft.

11. The system of claim 1, further comprising two or more propellers arranged in the fluid to serially increase a fluid velocity driven by the system, wherein each of the two or more propellers comprises:
a shaft;
a blade having an attack angle that is adjustable; and
a linkage connecting the blade to the shaft in an eccentric fashion, wherein
the control system is operable to vary the attack angle of the blade in a manner such that the blade sheds one or more dynamic stall vortices during each revolution of the shaft.

12. The system of claim 1, wherein the dynamic stall vortices are such that a dynamic lift coefficient that each of the dynamic stall vortices temporarily produces for the blade is larger than a maximum lift coefficient that can be achieved when the blade is held fixed.

* * * * *